United States Patent
Loomis et al.

(10) Patent No.: US 10,588,208 B1
(45) Date of Patent: Mar. 10, 2020

(54) COORDINATION OF MULTIPLE LIGHTING DISPLAYS

(71) Applicant: Seasons 4, Inc., Toano, VA (US)

(72) Inventors: Jason Loomis, Decatur, GA (US);
Jared Everline, Atlanta, GA (US);
Chris Dalio, Lilburn, GA (US)

(73) Assignee: Seasons 4, Inc., Toana, VA (US)

(*) Notice: Subject to any disclaimer, the term of this patent is extended or adjusted under 35 U.S.C. 154(b) by 0 days.

(21) Appl. No.: 16/178,348

(22) Filed: Nov. 1, 2018

(51) Int. Cl.
| | |
|---|---|
| H05B 33/08 | (2006.01) |
| H05B 37/02 | (2006.01) |
| F21K 9/238 | (2016.01) |
| F21W 121/04 | (2006.01) |
| F21Y 115/10 | (2016.01) |
| F21W 121/00 | (2006.01) |

(52) U.S. Cl.
CPC ........ *H05B 37/0281* (2013.01); *F21K 9/238* (2016.07); *H05B 37/0272* (2013.01); *F21W 2121/004* (2013.01); *F21W 2121/04* (2013.01); *F21Y 2115/10* (2016.07)

(58) Field of Classification Search
CPC ............... F21K 9/238; F21Y 2115/10; F21W 2121/004; F21W 2121/04; H05B 37/0272; H05B 37/0281
See application file for complete search history.

(56) References Cited

U.S. PATENT DOCUMENTS

| | | | | |
|---|---|---|---|---|
| 6,777,891 B2* | 8/2004 | Lys | ........................ | F21V 21/002 315/291 |
| 7,697,925 B1* | 4/2010 | Wilson | ..................... | H04M 1/22 455/418 |
| 2008/0143267 A1* | 6/2008 | Neuman | .............. | H05B 37/029 315/192 |
| 2009/0128461 A1* | 5/2009 | Geldard | ................ | G06F 3/1446 345/84 |
| 2014/0091719 A1* | 4/2014 | Tsai | .................... | H05B 37/0272 315/185 S |
| 2014/0152181 A1* | 6/2014 | Burkhart | ............ | H05B 33/0863 315/122 |
| 2015/0084515 A1* | 3/2015 | Altamura | ........... | H05B 37/0281 315/131 |
| 2015/0359066 A1* | 12/2015 | Loomis | .............. | H05B 37/0245 362/123 |
| 2018/0084626 A1* | 3/2018 | Song | ........................ | F21S 10/02 |
| 2018/0299084 A1* | 10/2018 | Chien | .................... | G03B 29/00 |
| 2018/0356084 A1* | 12/2018 | McRae | ................. | F21V 23/009 |

* cited by examiner

*Primary Examiner* — Alexander H Taningco
*Assistant Examiner* — Kurtis R Bahr
(74) *Attorney, Agent, or Firm* — Kinney & Lange, P.A.

(57) ABSTRACT

Apparatus and associated methods relate to synchronizing a plurality of lighting display controllers so as to temporally coordinate a corresponding plurality of lighting displays controlled thereby. A clock or timer is configured to generate a time sequence of timing signals, to which the plurality of lighting display systems synchronize themselves. Each of the plurality of lighting display systems display a first of a time sequence of spatial illumination patterns in response to receiving, from the transmitter, a signal indicative of a temporal start of the synchronized plurality of lighting displays. Each of the plurality of lighting display systems displays a subsequent spatial illumination patterns in response to receiving, from the transmitter, a subsequent timing signal.

20 Claims, 4 Drawing Sheets

COORDINATION OF MULTIPLE LIGHTING DISPLAYS

BACKGROUND

Decorative lighting displays are used to communicate a joy of a holiday season, to draw attention to merchandise, or to simply decorate or adorn an object. Decorative lighting displays can be used both indoors and outdoors. Decorative lighting displays have been used residentially to adorn trees, shrubs, and houses. Commercial businesses can use decorative lighting displays to provide festive atmospheres at their places of business.

Some such decorations can involve many decorative lighting displays. Some such lighting displays can provide a time sequence of spatial illumination patterns. When multiple such time sequences of spatial illumination patterns are produced, such illumination patterns can be uncoordinated with one another. Because such illumination patterns can be uncoordinated with one another, these lighting displays can be less compelling than if such lighting displays were coordinated with one another.

SUMMARY

Apparatus and associated methods relate to a system for synchronizing a plurality of lighting display controllers so as to temporally coordinate a corresponding plurality of lighting displays controlled thereby. The system includes a timer configured to generate a time sequence of timing signals. The system includes a transmitter configured to transmit timing signals to the plurality of lighting display signals. The system includes one or more processors, and computer-readable memory. The computer readable memory is encoded with instructions that, when executed by the one or more processors, cause the system to transmit, to the plurality of lighting display controllers via the transmitter, a timing signal indicative of a temporal start to the corresponding plurality the lighting displays controlled thereby. The computer readable memory is further encoded with instructions that, when executed by the one or more processors, cause the system to transmit, to the plurality of lighting display controllers via the transmitter, the time sequence of timing signals to which each of the plurality of lighting display controllers temporally coordinates its respective lighting display.

Some embodiments relate to a lighting display controller that generates illumination signals configured to generate a time sequence of spatial illumination patterns. The lighting display controller includes a receiver. The receiver is configured to receive, from a system for synchronizing a plurality of spatial illumination patterns, a timing signal indicative of a temporal start to the time sequence of spatial illumination patterns. The receiver is further configured to receive, from the system for synchronizing the time sequence of spatial illumination patterns, a time sequence of timing signals. The lighting display controller further includes one or more processors and computer-readable memory. The computer-readable memory is encoded with instructions that, when executed by the one or more processors, cause the lighting display controller to generate, in response to the received timing signal indicative of the temporal start to the plurality of spatial illumination patterns, an illumination signal corresponding to a first of the time sequence of spatial illumination patterns. The computer-readable memory is further encoded with instructions to generate, in response to each subsequent one of the received time sequence of timing signals, an illumination signal corresponding to a subsequent one of the plurality of spatial illumination patterns.

DETAILED DESCRIPTION

Apparatus and associated methods relate to synchronizing a plurality of lighting display controllers so as to temporally coordinate a corresponding plurality of lighting displays controlled thereby. A clock or timer is configured to generate a time sequence of timing signals, to which the plurality of lighting display systems synchronize themselves. Each of the plurality of lighting display systems display a first of a time sequence of spatial illumination patterns in response to receiving, from the transmitter, a signal indicative of a temporal start of the synchronized plurality of lighting displays. Each of the plurality of lighting display systems displays a subsequent spatial illumination patterns in response to receiving, from the transmitter, a subsequent timing signal.

Figure 1:
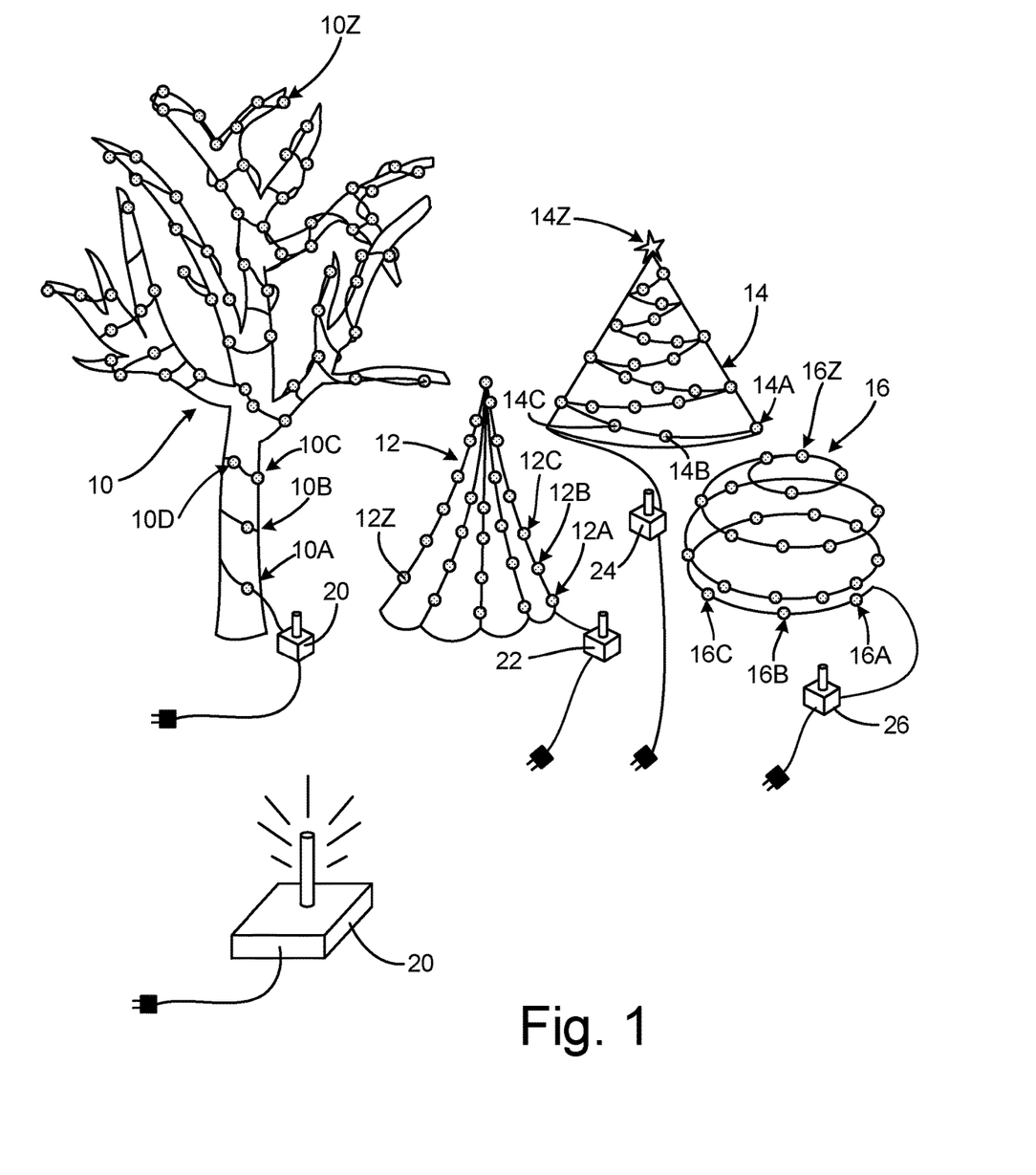
FIG. 1 is a perspective view of a plurality of lighting displays being synchronized by a lighting-display synchronizing system.

FIG. 1 is a perspective view of a plurality of lighting displays being synchronized by a lighting-display synchronizing system. In FIG. 1, four lighting displays 10, 12, 14 and 16 are synchronously operating, in response to timing signals received from synchronization system 18. Synchronization system 18 generates and transmits such timing signals to lighting display controllers 20, 22, 24 and 26, so as to temporally synchronize the corresponding plurality of lighting displays 10, 12, 14 and 16 controlled thereby.

Each of lighting displays 10, 12, 14 and 16 includes is a light sting having a plurality of Light-Emitting Diodes (LEDs) 10A-10Z, 12A-12Z, 14A-14Z and 16A-16Z, respectively. In other embodiments, lighting displays can include other types of illumination devices and other arrangements of illumination devices. For example, lighting displays can include incandescent lamps, lasers diodes, holograms, etc. Furthermore, such devices can have fixed and/or flexible configurations.

In the FIG. 1 depiction, system 20 is shown wirelessly transmitting timing signals to lighting display controllers 20, 22, 24 and 26. In some embodiments, system 20 can transmit timing signals to lighting display controllers 20, 22, 24 and 26 via a wired communication network. System 20 transmits, to lighting display controllers 20, 22, 24 and 16, a timing signal indicative of a temporal start to the corresponding lighting displays 10, 12, 14 and 16 controlled thereby. In response to receiving the timing signal indicative of a temporal start to lighting displays 10, 12, 14 and 16, each of lighting display controllers 20, 22, 24 and 26 then generate an illumination signal corresponding to a first of the time sequence of spatial illumination patterns.

Each of the generated illumination signals is configured to cause the corresponding lighting display 10, 12, 14 or 16 to create a first spatial illumination pattern of time sequence of illumination patterns. Various time sequences of spatial illumination patterns can be utilized by each of the lighting display controllers 20, 22, 24 and 26. Lighting display controller 20 might, for example, simply generate a signal that causes all of the LEDs 10A-10Z to be fully turned on (e.g., to a fixed color, or to a controlled color), in response to receiving the timing signal indicative of a temporal start to lighting displays 10, 12, 14 and 16. Lighting display controller 22, however, might generate a signal that causes each of the LEDs 12A-12Z to be fully turned on, but in a rainbow colored sequence from the first to the last lighting element, in response to receiving the timing signal indicative of a temporal start to lighting displays 10, 12, 14 and 16. Lighting display controller 24 might, for example, generate a signal that causes only modulo 3 devices (i.e., the third, sixth, ninth, twelfth, etc.) of the LEDs 14A-14Z to be turned on to a specific color (e.g., blue), in response to receiving the timing signal indicative of a temporal start to lighting displays 10, 12, 14 and 16. Finally, lighting display controller 20 might, for example, generate a signal that causes some or all of the LEDs 16A-16Z to flicker on and off (e.g., to a fixed color, or to a controlled color), in response to receiving the timing signal indicative of a temporal start to lighting displays 10, 12, 14 and 16.

After transmitting the signal indicative of the temporal start to lighting display controllers 20, 22, 24 and 26, system 20 then transmits, to lighting display controllers 20, 22, 24 and 26, a time sequence of timing signals, to which each of the plurality of lighting display controllers temporally coordinates its respective lighting display. This time sequence of timing signals is analogous to a signal given by a conductor of a choir or orchestra to the individual members thereof. This time sequence of timing signals is indicative of a time at which each of lighting controllers 20, 22, 24 and 26 can generate an illumination signal corresponding to a subsequent one (e.g., a second, third, fourth, etc.) of the time sequence of spatial illumination patterns. In some embodiments, the time sequence of timing signals is a periodic time sequence of timing signals. In other embodiments, the time sequence of timing signals may be of compound metric (e.g., alternating between two different time intervals between adjacent pairs of timing signals). In still other embodiments, the time sequence of timing signals can be generated to be synchronized with an auditory signals, such as a drum beat, etc.

In response to receiving the first of the time sequence of timing signals, lighting display controller 20 might, for example, simply generate a signal that causes all of the LEDs 10A-10Z which had been fully turned on (e.g., to a fixed color, or to a controlled color), to simply turn off. Lighting display controller 22, however, might generate a signal that causes each of the LEDs 12A-12Z which had been fully turned on in a rainbow colored sequence to translate or offset the rainbow colored sequence, so as to appear as if the rainbow sequence were spatially traversing the light string. Lighting display controller 24 might, for example, generate a signal, which previously illuminated only modulo 3 devices (i.e., the third, sixth, ninth, twelfth, etc.), now to cause only modulo 3 plus 1 devices (i.e., the first, fourth, seventh, tenth, etc.) of the LEDs 14A-14Z to be turned on to the same specific color (e.g., blue), in response to receiving the first of the time sequence of timing signals. Finally, lighting display controller 20 might, for example, generate a signal that causes some or all of the LEDs 16A-16Z to be turned fully on (e.g., to a fixed color, or to a controlled color), in response to receiving the first of the time sequence of timing signals.

Each of the lighting display controllers 20, 22, 24 and 26 can have a library, for example, of these various time sequences of spatial illumination patterns, from which to select a specific time sequence of spatial illumination patterns, such as the ones described above. In some embodiments, the specific time sequence of spatial illumination patterns can be selected via a user interface of each of lighting display controllers 20, 22, 24 and 26. In other embodiments, the specific time sequence of spatial illumination patterns can be commanded by a display selection signal transmitted by synchronization system 18.

Figure 2:
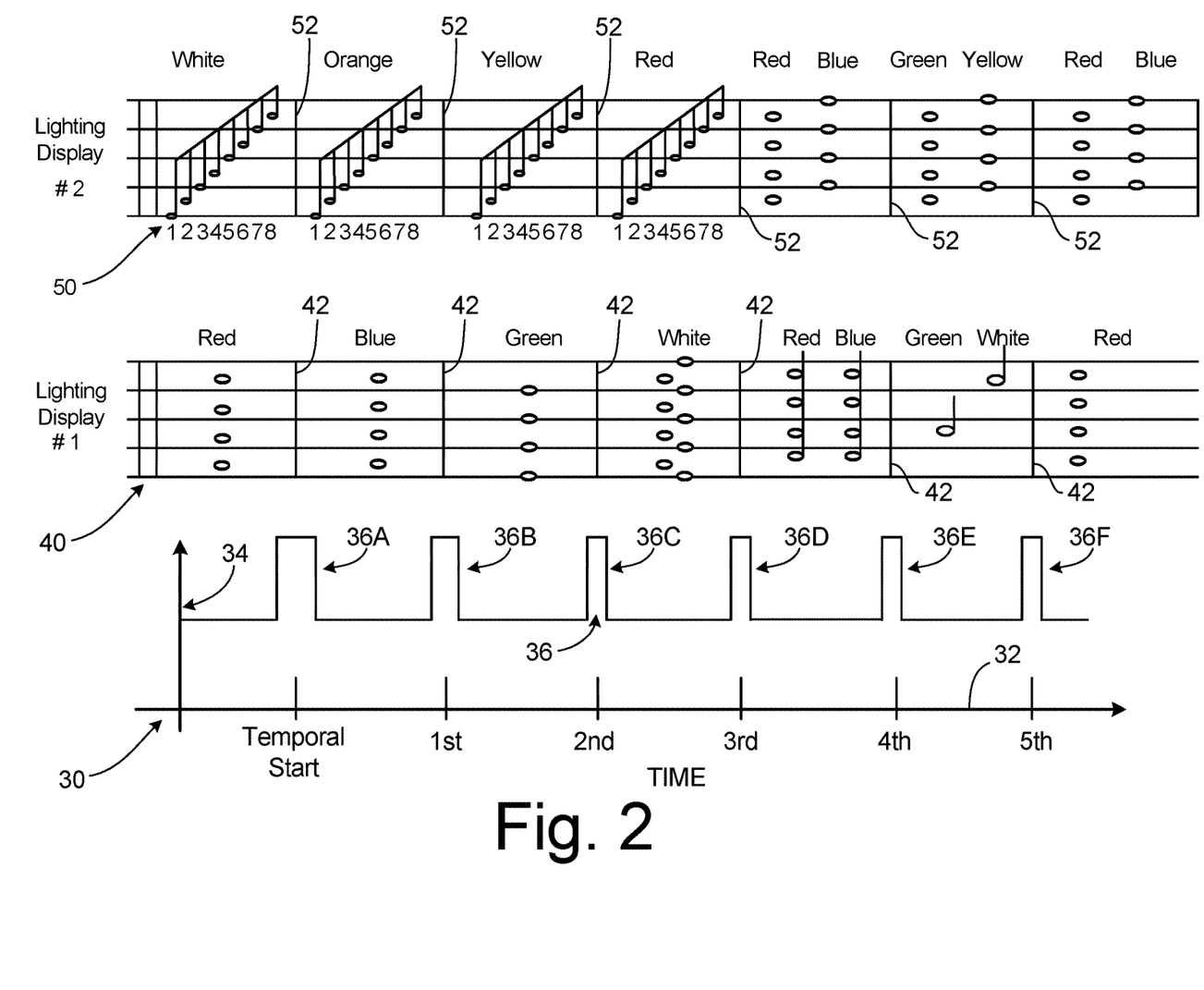
FIG. 2 is a schematic diagram of a two different time sequences of lighting display patterns synchronized via timing signals generated by a lighting-display synchronizing system.

FIG. 2 is a schematic diagram of a two different time sequences of lighting display patterns synchronized via timing signals generated by a lighting-display synchronizing system. FIG. 2 includes graph 30 and music clefs 40 and 50. Graph 30 depicts relation 36 between the amplitude of timing signals generated by synchronization system 18 (depicted in FIG. 1) and time. Graph 30 includes horizontal axis 32, which is indicative of time, and vertical axis 34, which is indicative of signal amplitude of timing signals generated by synchronization system 18. Relation 36 includes individual timing signal pulses 36A-36F. Such individual timing signal pulsed 36A-37F can be encoded in various manners (e.g., AM modulation, FM modulation, phase modulation, etc.), by synchronization system 18.

Timing signal 36A is indicative of a temporal start to the time sequence of spatial lighting patterns. Timing signal 36A can indicate such a temporal start in various manners. For example, timing signal 36A can have a pulse width that is longer than the time sequence of timing signals 36B-36F to which each of lighting display controllers 20, 22, 24 and 26 (depicted in FIG. 1) temporally coordinates its respective lighting display 10, 12, 14 and 16 (also depicted in FIG. 1). In some embodiments, timing signal 36A can be encoded with indicia of the temporal start.

Timing signals 36A-36F can be used in various temporal manners. For example, in some embodiments timing signal 36A can be encoded with a time signature, such as four-four time (i.e., four beats between successive timing signals 36A-36F). Timing signals 36A-36F can indicate a down beat of a measure of time. Then, lighting display controllers 20, 22, 24 and 26 can synchronize their respective lighting displays accordingly. For example, lighting display controllers 20, 22, 24 and 26 can generate four consecutive illumination signal corresponding to a four consecutive spatial illumination patterns (e.g., a first, second, third, and fourth) of the time sequence of spatial illumination patterns.

In some embodiments, timing signal 36A can be encoded with display selection indicia, such a display selection signal can be indicative of a specific one of a library of time sequences of spatial illumination patterns stored within each of lighting display controllers 20, 22, 24 and 26. For example, each of lighting controllers 20, 22, 24 and 26 can have a library of different time sequences of spatial illumination patterns. Some of the plurality of time sequences of spatial illumination patterns can have many abrupt lighting changes, such as flashing lights and quick color changes, while others can have gradual lighting changes such as slow color transitions or slow intensity changes. Some of the plurality of time sequences of spatial illumination patterns can correspond to specific time signatures, such as three beats per measure or four beats per measure, etc.

Music clef 40 depicts a time sequence of spatial illumination patterns as notes on musical clef 40. Measure lines 42 are aligned with timing signals 36A-36F of graph 30, such that a measure corresponds to a time difference between adjacent timing signals 36A-36F. Music clef 40 represents, in musical notation, a specific time sequence of spatial illumination patterns from a library of time sequences of spatial illumination patterns. For example, music clef 40 might represent a specific time sequence of spatial illumination patterns being controlled by lighting display controller 20 (depicted in FIG. 1).

Each of the lines and spaces in music clef 40 can be indicative of a specific LED or illumination device of corresponding lighting display 10. Notes on music clef 40 indicate that the specific LED or illumination device indicated by the notes location (i.e., the specific line or space) is illuminated. The quality of the illumination of the specific LED or illumination device is further indicated by text above or below the note. For example, the first measure of music clef 40 indicates that the second, fourth, sixth, and eight LED (represented by the spaces where notes are indicated) are illuminated in RED. Such illumination will be maintained throughout the whole of the first measure, beginning when timing pulse 36A is received until the timing pulse 36B is received. The second measure of music clef 40 indicates that the second, fourth, sixth, and eight LED (represented by the spaces where notes are indicated) are illuminated in BLUE.

Music clef 50 depicts another time sequence of spatial illumination patterns different from the one depicted in music clef 40. Measure lines 42 are again aligned with timing signals 36A-36F of graph 30, such that a measure corresponds to a time difference between adjacent timing signals 36A-36F. Music clef 50 might represent, for example a specific time sequence of spatial illumination patterns being controlled by lighting display controller 22 (depicted in FIG. 1). Because both lighting display controllers 20 and 22 are synchronizing their specific time sequence of spatial illumination patterns with the same timing signals 36A-36F, the time sequences of spatial illumination patterns represented by music clefs 40 and 50 will be synchronized to one another.

Figure 3:
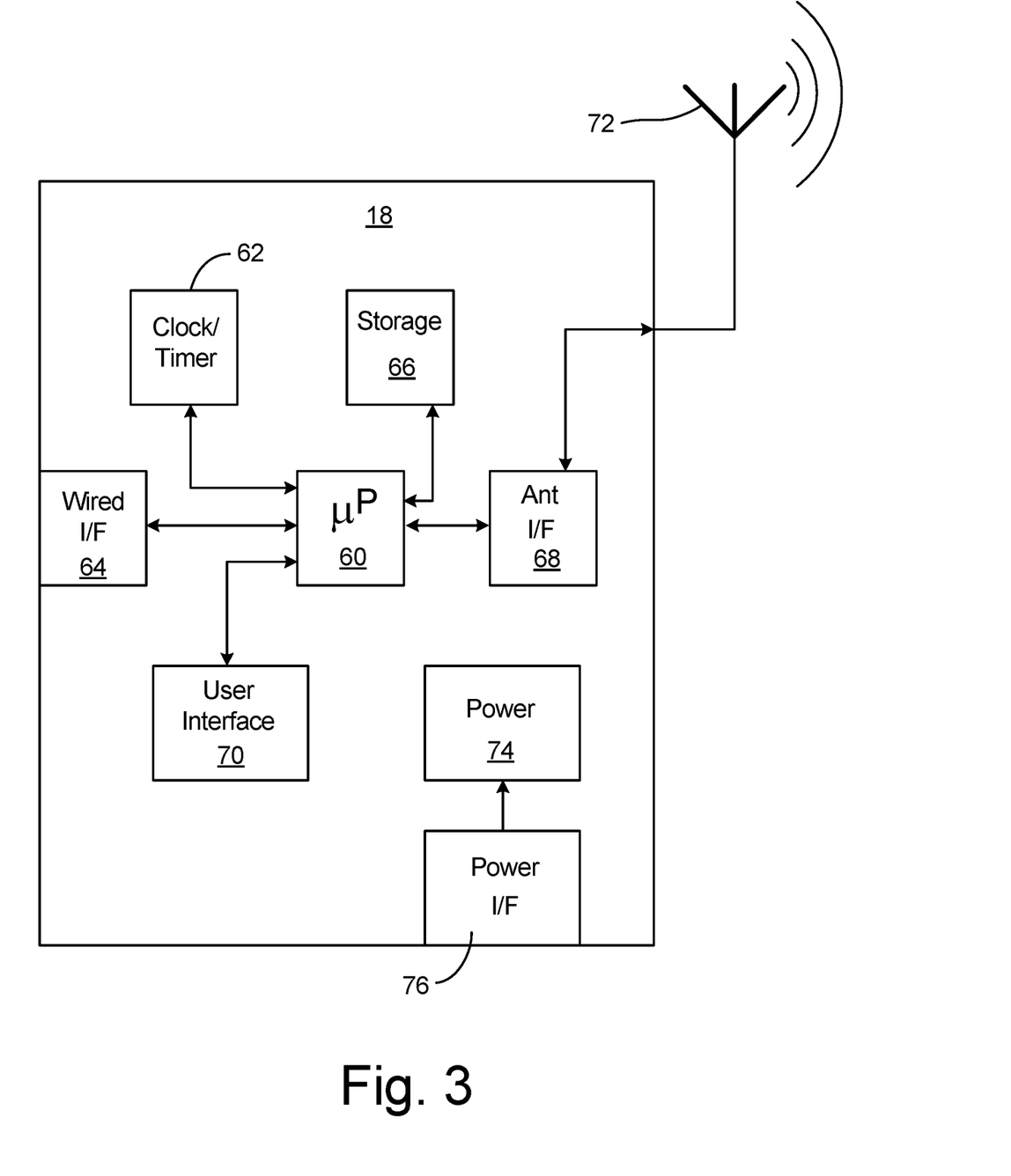
FIG. 3 is a block diagram of an embodiment of a system for synchronizing a plurality of lighting display controllers so as to temporally coordinate a corresponding plurality of lighting displays controlled thereby.

FIG. 3 is a block diagram of an embodiment of a system for synchronizing a plurality of lighting display controllers so as to temporally coordinate a corresponding plurality of lighting displays controlled thereby. In the depicted embodiment, synchronization system 18 can be any device capable of executing computer-readable instructions defining a software program implementing synchronization of a plurality of lighting displays. Examples of synchronization system 18 can include, but are not limited to, laptop computers, mobile phones (including smartphones), tablet computers, personal digital assistants (PDAs), desktop computers, servers, mainframes, or other computing devices.

As illustrated in FIG. 3, synchronization system 18 includes processor(s) 60, clock/timer 62, wired interface 64, storage device(s) 66, antenna interface 68, and user interface 70, antenna 72, power converter 74, and power interface 76. In certain examples, however, synchronization system 18 can include more or fewer components. For instance, some embodiments of synchronization system 18 might not include wired interface 64. In some examples, such as where synchronization system 18 is a mobile or portable device such as a laptop computer, synchronization system 18 may include additional components such as a battery that provides power to components of synchronization system 18 during operation. Antenna interface 68 and antenna 72 can serve as a transmitter to broadcast synchronization signals to one or more receiving devices.

Processor(s) 60, in one example, are configured to implement functionality and/or process instructions for execution within synchronization system 18. For instance, processor(s) 60 can be capable of processing instructions stored in storage device(s) 66. Examples of processor(s) 60 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 66 can be configured to store information within synchronization system 18 during operation. Storage device(s) 66, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 66 are a temporary memory, meaning that a primary purpose of storage device(s) 66 is not long-term storage. Storage device(s) 66, in some examples, are described as volatile memory, meaning that storage device(s) 66 do not maintain stored contents when power to synchronization system 18 is turned off. Examples of volatile memories can include random access memories (RAM), dynamic random access memories (DRAM), static random access memories (SRAM), and other forms of volatile memories. In some examples, storage device(s) 66 are used to store program instructions for execution by processor(s) 60. Storage device(s) 66, in one example, are used by software or applications running on synchronization system 18 (e.g., a software program implementing lighting display synchronization) to temporarily store information during program execution.

Storage device(s) 66, in some examples, also include one or more computer-readable storage media. Storage device(s) 66 can be configured to store larger amounts of information than volatile memory. Storage device(s) 66 can further be configured for long-term storage of information. In some examples, storage device(s) 66 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 70 of synchronization system 18, in some examples, can be a Graphical User Interface (GUI) or can be a communications device, such as a wired or a wireless interface, so as to communication with a user of a wired or wireless network. Such a GUI can include input and/or output devices. Examples of input devices include a mouse, a keyboard, a microphone, a camera device, a presence-sensitive and/or touch-sensitive display, or other type of device configured to receive input from a user. Examples of output device can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users.

User interface 70 can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

Synchronization system 18 can communicate with a plurality of lighting display controllers via wired interface 64 and/or in a wireless manner. Wired interface 64 can be a custom communication interface or any communication interface using a standard communication protocol. For example, wired communication can use such network interfaces as Ethernet or Universal Serial Bus (USB) protocols. Wired interface 64 can be fixedly connected to one or more lighting display controllers or can be an electrical connector, to which one or more lighting display controllers can removeably couple.

Synchronization system 18 can wirelessly communicate with a plurality of lighting display controllers via antenna interface 68 and antenna 72. Wireless communication between synchronization system 18 and the plurality of lighting controllers can be performed using a custom protocol or any of the standard wireless communications protocols. For example, wireless communication can be performed using Bluetooth, 3G, 4G, or Wi-Fi radio computing protocols.

Power converter 74 and power interface 76 can be configured in various manners as well. For example, power converter 74 may be configured to convert standard AC line power to low-voltage DC operating power, and power interface 76 can be a standard wall connector. In other embodiments, power interface 76 can be a connector configured to interface with a low-voltage DC power source.

Figure 4:
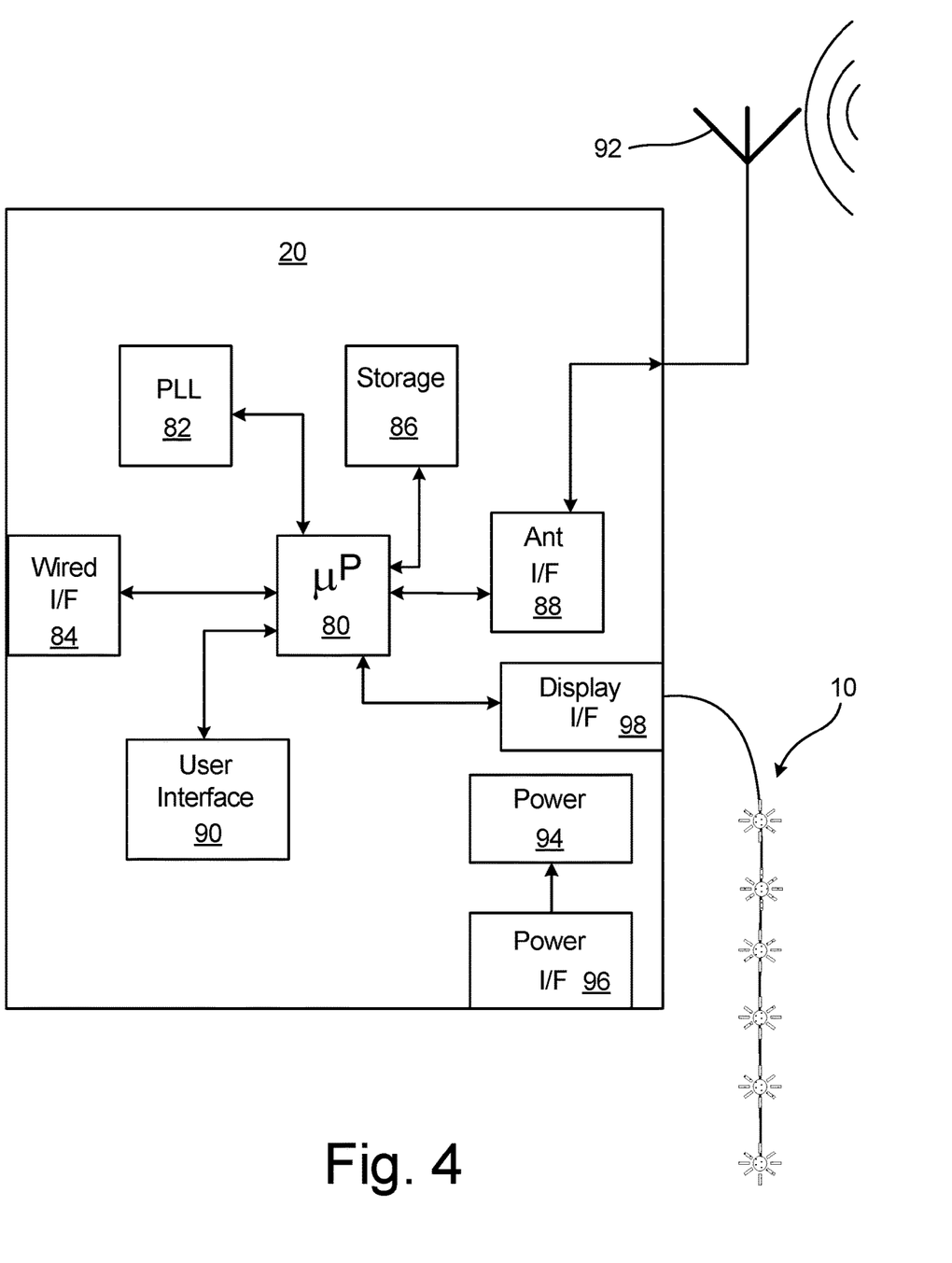
FIG. 4 is a block diagram of an embodiment of a lighting display controller having synchronization capability.

FIG. 4 is a block diagram of an embodiment of a lighting display controller having synchronization capability. As illustrated in FIG. 4, lighting display controller 20 includes processor(s) 80, Clock/Timer 82, wired interface 84, storage device(s) 86, antenna interface 88, and user interface 90, antenna 92, power converter 94, power interface 96, display interface 98 and lighting display 10. In certain examples, however, lighting display controller 20 can include more or fewer components. For instance, some embodiments of lighting display controller 20 might not include wired interface 84. Antenna interface 88 and antenna 92 can serve as a receiver to receive synchronization signals broadcast by a transmitter.

Processor(s) 80, in one example, are configured to implement functionality and/or process instructions for execution within lighting display controller 20. For instance, processor(s) 80 can be capable of processing instructions stored in storage device(s) 86. Examples of processor(s) 80 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 86 can be configured to store information within lighting display controller 20 during operation. Storage device(s) 86, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 86 are a temporary memory, meaning that a primary purpose of storage device(s) 86 is not long-term storage. Storage device(s) 86, in some examples, are described as volatile memory, meaning that storage device(s) 86 do not maintain stored contents when power to lighting display controller 20 is turned off. Examples of volatile memories can include random access memories (RAM), dynamic random access memories (DRAM), static random access memories (SRAM), and other forms of volatile memories. In some examples, storage device(s) 86 are used to store program instructions for execution by processor(s) 80. Storage device(s) 86, in one example, are used by software or applications running on lighting display controller 20 (e.g., a software program implementing lighting display synchronization) to temporarily store information during program execution.

Storage device(s) 86, in some examples, also include one or more computer-readable storage media. Storage device(s) 86 can be configured to store larger amounts of information than volatile memory. Storage device(s) 86 can further be configured for long-term storage of information. In some examples, storage device(s) 86 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 90 of synchronization system 18, in some examples, can be a Graphical User Interface (GUI) or can be a communications device, such as a wired or a wireless interface, so as to communication with a user of a wired or wireless network. Such a GUI can include input and/or output devices. Examples of input devices include a mouse, a keyboard, a microphone, a camera device, a presence-sensitive and/or touch-sensitive display, or other type of device configured to receive input from a user. Examples of output device can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users.

User interface 90 can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

Lighting display controller 20 can communicate with a synchronization system (such as synchronization system 18 depicted in FIG. 3) via wired interface 84 and/or in a wireless manner. Wired interface 84 can be a custom communication interface or any communication interface using a standard communication protocol. For example, wired communication can use such network interfaces as Ethernet or Universal Serial Bus (USB) protocols. Wired interface 84 can be fixedly connected to one or more lighting display controllers or can be an electrical connector, to which one or more lighting display controllers can removeably couple.

Lighting display controller 20 can wirelessly communicate with synchronization system 18 via antenna interface 88 and antenna 92. Wireless communication between synchronization system 18 and synchronization system 18 can be performed using a custom protocol or any of the standard wireless communications protocols. For example, wireless communication can be performed using Bluetooth, 3G, 4G, or Wi-Fi radio computing protocols.

Power converter 94 and power interface 96 can be configured in various manners as well. For example, power converter 94 may be configured to convert standard AC line power to low-voltage DC operating power, and power interface 96 can be a standard wall connector. In other embodiments, power interface 96 can be a connector configured to interface with a low-voltage DC power source.

Lighting display controller 20 provides signals, via display interface 98, to lighting display 10 that cause lighting display 10 to present a spatial illumination pattern corresponding to the provided signal. Lighting display 10 can include one or more illumination devices, such as one or more LEDs, incandescent lamps, laser diodes, etc. In some embodiments, each of the one or more illumination devices of lighting display 10 can be independently controllable. For example, lighting display 10 can include a plurality of independently controllable LEDs, each having Red, Green, and Blue LED components. The signal provide to lighting display controller can be a serial chain of control commands, each of which corresponds to one of the plurality of independently controllable illumination devices. Color, and/or intensity can be controlled in such a manner. In other embodiments, each of the plurality of illumination devices may be configured to illuminate in the same manner. Control of such a lighting display can be limited to intensity and/or color of the plurality of illumination devices acting in unison.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for synchronizing a plurality of light-string controllers so as to temporally coordinate a corresponding plurality of lighting displays controlled thereby, the system comprising:
   a timer configured to generate a time sequence of timing signals;
   a transmitter configured to transmit timing signals to the plurality of light-string controllers;
   one or more processors; and
   computer-readable memory encoded with instructions that, when executed by the one or more processors, cause the system to:
   transmit, to the plurality of light-string controllers via the transmitter, a timing signal indicative of a temporal start to the corresponding plurality the lighting displays controlled thereby; and
   transmit, to the plurality of light-string controllers via the transmitter, only the time sequence of timing signals to which each of the plurality of light-string controllers temporally coordinates its respective lighting display throughout the duration of the plurality of lighting displays so as to synchronize the corresponding plurality of light-string controllers,
   wherein each of the plurality of lighting displays is a time sequence of spatial illumination patterns stored within a corresponding one or the plurality of light string controllers.

2. The system of claim 1, wherein the timing signal indicative of a temporal start to the corresponding plurality of spatial illumination patterns is configured to cause each of the plurality of light-string controllers to cause a first spatial illumination pattern of the time sequence of spatial illumination patterns to illuminate.

3. The system of claim 1, wherein each of the time sequence of timing signals is configured to cause the plurality of light-string controllers to cause a next spatial illumination pattern of the time sequence of spatial illumination patterns to illuminate.

4. The system of claim 1, wherein the time sequence of timing signals is a periodic sequence of timing signals.

5. The system of claim 1, further comprising:
   a user interface.

6. The system of claim 1, wherein the computer-readable memory is further encoded with instructions that, when executed by the one or more processors, cause the system to:
   transmit a display selection signal indicative of a specific one of a library of lighting displays stored within each of the plurality of light-string controllers.

7. The system of claim 1, wherein the transmitter is a radio frequency transmitter, and wherein the timing signal indicative of the temporal start of the lighting display and the time sequence of timing signals to which each of the plurality of light-string controllers temporally coordinates its respective lighting display are wirelessly transmitted via the radio frequency transmitter.

8. The system of claim 1, further comprising:
   an electrical output connector, to which a light-string controller can be connected so as to conductively receive the timing signal indicative of the temporal start of the lighting display and the time sequence of timing signals transmitted by the system.

9. A light-string controller for generating a time sequence of spatial illumination patterns of a lighting display that is synchronized with a time sequence of timing signals, the light-string controller comprising:
   a receiver configured to:
   receive, from a system for synchronizing a plurality of spatial illumination patterns lighting displays, a timing signal indicative of a temporal start to the time sequence of spatial illumination patterns;
   receive, from the system for synchronizing the time sequence plurality of spatial illumination patterns, only the time sequence of timing signals throughout a duration of the lighting display so as to synchronize the spatial illumination patterns with the time sequence of timing signals;
   one or more processors; and
   computer-readable memory encoded with data indicative of the time sequence of spatial illumination patterns, the computer readable memory further encoded with instructions that, when executed by the one or more processors, cause the light-string controller to:
   generate, in response to the received timing signal indicative of the temporal start to the plurality of spatial illumination patterns, an illumination signal corresponding to a first of the time sequence of spatial illumination patterns;
   generate, in response to each subsequent one of the received time sequence of timing signals, an illumination signal corresponding to a subsequent one of the plurality of spatial illumination patterns.

10. The light-string controller of claim 9, further comprising:
    a light string including a plurality of Light-Emitting Diodes (LEDs) conductively coupled so as to receive each of the first and subsequent illumination signals corresponding the time sequence of spatial illumination patterns.

11. The light-string controller of claim 10, wherein each of the LEDs is independently controllable.

12. The light-string controller of claim 11, wherein the illumination signal corresponding to a subsequent one of the plurality of spatial illumination patterns includes:
   a plurality of sub-signals each corresponding to a particular one of the plurality of LEDs.

13. The light-string controller of claim 10, wherein the LEDs are configured to operate in unison with one another.

14. The light-string controller of claim 9, wherein the receiver is configured to receive timing signals wirelessly.

15. The light-string controller of claim 9, wherein the receiver is configured to receive timing signals via a wired connection.

16. The light-string controller of claim 9, wherein the computer-readable memory is further encoded with instructions that, when executed by the one or more processors, cause the light-string controller to:
   retrieve, from the computer readable memory, the time sequence of spatial illumination patterns from a plurality of time sequences of spatial illumination patterns, which are stored therein.

17. The light-string controller of claim 9, wherein the time sequence of timing signals is a periodic sequence of timing signals.

18. The light-string controller of claim 9, further comprising:
   a clock signal generator configured to generate a clock signal that is synchronized with the time sequence of timing signals received from the system for synchronizing the time sequence of spatial illumination patterns.

19. The light-string controller of claim 9, further comprising:
   an electrical output connector, to which a lighting display can be connected so as to receive each of the first and subsequent timing signals corresponding the time sequence of spatial illumination patterns.

20. The light-string controller of claim 9, wherein the computer-readable memory is further encoded with instructions that, when executed by the one or more processors, cause the light-string controller to:
   receive, from a system for synchronizing a plurality of spatial illumination patterns, a display selection signal indicative of a specific one of a library of lighting displays stored within the computer-readable memory.

* * * * *